Patented June 28, 1949

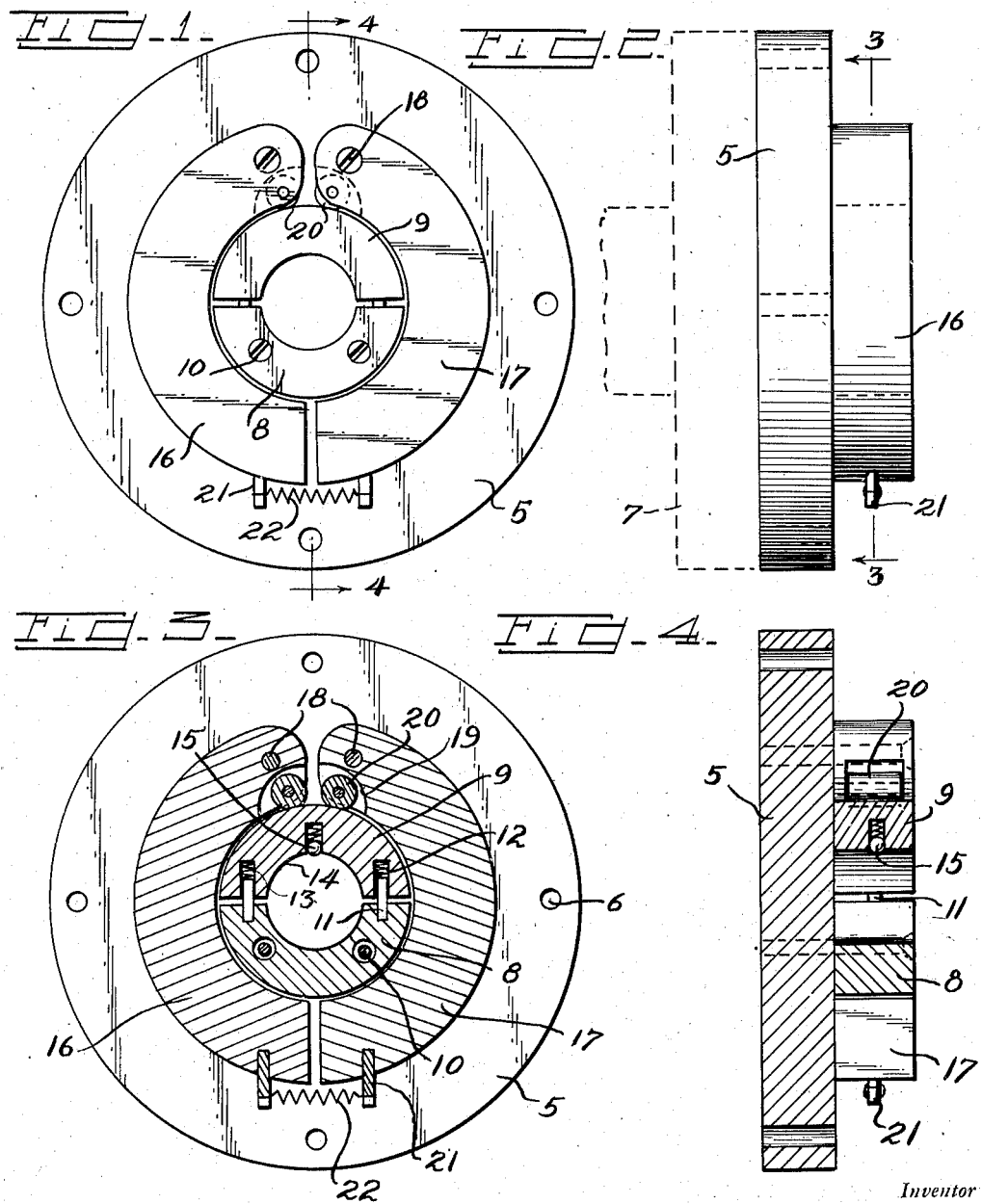

2,474,633

UNITED STATES PATENT OFFICE 2,474,633

AUTOMATIC LATHE CHUCK

James F. Marshall, Newton, Iowa

Application July 10, 1946, Serial No. 682,496

2 Claims. (Cl. 279—106)

The present invention relates to new and useful improvements in lathe chucks and more particularly to a device of this character actuated by centrifugal action to automatically grip the work for holding the same on the machine for rotation therewith.

An important object of the invention is to provide a device of this character in which its gripping action on the work is increased in accordance with an increase in the speed of the machine.

A further object of the invention is to provide an automatic lathe chuck which simplifies and reduces the loading and unloading time required for the work whereby to promote economy on mass production jobs.

A still further object is to provide a device of this character which may be easily and quickly attached to a face plate of a lathe or other machines, or which may be secured to a lathe spindle.

Another object is to provide a device of this character simple in fact for construction and which is efficient and reliable in operation, relatively inexpensive to manufacture and otherwise well adapted for the purposes for which the same is attempted.

Other objects and advantages reside in the details of construction and operation as more fully hereinafter described and claimed, reference being had to the accompanying drawings forming part hereof, wherein like numerals refer to like parts throughout, and in which:

Figure 1 is a front elevational view.

Figure 2 is a side elevational view.

Figure 3 is a sectional view taken on line 3—3 of Figure 2.

Figure 4 is a transverse sectional view taken on line 4—4 of Figure 1.

Referring now to the drawings in detail wherein for the purpose of illustration I have disclosed a preferred embodiment of invention, the numeral 5 designates an attaching plate of a disk form having bolt openings at 6 therein for attaching the plate to the front surface of a face plate 7 of a conventional construction and which is mounted for rotation on a lathe or other machines.

A pair of semi-circular jaws 8 and 9 are positioned against the outer surface of the attaching plate 5, the jaw 8 being secured thereto in a stationary position by bolts or screws 10.

A pair of guide pins 11 have one end recessed in the ends of the stationary jaw 8 while the other ends of the pins are slidably received in recesses 12 of the movable jaw 9. Coil springs 13 are positioned in the recesses 12 behind the pins 11 to urge the jaws 9 into an open position, the jaws cooperating to grip the work or stock in the opening 14 at the center of the jaws. A spring projected ball 15 is carried by the movable jaw 9 to bear against the work to hold the same in the machine while the machine is gaining speed.

A pair of semi-circular dogs 16 and 17 surround the jaws 8 and 9, one end of the dogs being pivoted to the attaching plate 5 by pins or the like 18, the dogs preferably being of heavy metal or weighted to swing the free ends of the dogs away from the jaws by centrifugal action during rotation of the machine.

The ends of the dogs 16 and 17 are positioned at 90 degrees with respect to the free ends of the jaws 8 and 9 as shown in Figure 3 of the drawings and with the free ends of the dogs positioned adjacent the outer periphery of the stationary jaw 8, thus bringing the pivoted ends of the dogs adjacent the outer periphery of the movable jaw 9 and at points substantially intermediate the ends of the latter.

The inner periphery of the dogs 16 and 17, at their pivoted ends, are provided with recesses 19 in which rollers 20 are journaled with one side of the rollers exposed at the inner corner of the dogs at the pivoted ends thereof. The axes of the rollers 20 are positioned closer to each other than the axes of the pins 18 whereby an outward swinging movement of the free ends of the dogs 16 and 17 will cause a radial inward movement of the rollers 20 whereby to bear against the movable jaw 9 to thus contract the opening 14 and cause a gripping engagement of the jaw 9 with the work or stock positioned therein. An increase in the speed of rotation of the machine will increase the gripping action of the dogs 16 and 17 on the jaw 9 to thus firmly hold the work in position on the lathe.

Upon stopping of the machine the free ends of the dogs 16 are moved toward a closed position for releasing the rollers 20 by means of pins 21 recessed in the periphery of the dogs and projecting substantially radially therefrom and connected to each other by means of a coil spring 22.

Of the foregoing it will be apparent that the movable jaw 9 is normally held in an open position by means of the springs 13 and spring 22 releasing pressure on the movable jaw by the rollers 20 whereby the end of the work may be easily and quickly placed in the opening 14 and removed therefrom. When the machine is rotated the dogs 16 and 17 will swing outwardly whereby to exert pressure on the movable jaw 9 by the rollers 20 and clamp the work in position between the jaws.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A lathe chuck comprising an attaching member, a pair of semi-circular jaws carried by said member, one jaw being fixed thereon and the other being movable toward the fixed jaw, a pair of rollers upon opposite sides of the transverse center of the movable jaw, and means responsive to centrifugal action to move said rollers circumferentially of the movable jaw tangentially thereof for moving the movable jaw toward the fixed jaw.

2. A lathe chuck comprising an attaching member, a pair of semi-circular jaws carried by said member, one jaw being fixed thereon and the other jaw being movable toward the fixed jaw, spring means biasing said movable jaw away from the fixed jaw, a pair of rollers upon opposite sides of the transverse center of the movable jaw, and means responsive to centrifugal action to move said rollers circumferentially of the movable jaw tangentially thereof for moving the movable jaw toward the fixed jaw in opposition to said spring means.

JAMES F. MARSHALL.

REFERENCES CITED

The following references are of record in the file of this patent:

UNITED STATES PATENTS

| Number | Name | Date |
|---|---|---|
| 87,929 | Hawkins | Mar. 16, 1869 |
| 846,193 | Fellows | Mar. 5, 1907 |
| 1,149,148 | Miller | Aug. 3, 1915 |
| 1,430,689 | Schroeder et al. | Oct. 31, 1922 |
| 2,420,128 | Fisher | May 6, 1947 |

FOREIGN PATENTS

| Number | Country | Date |
|---|---|---|
| 481,505 | France | Sept. 1916 |